US012692022B2

(12) United States Patent
Reiss et al.

(10) Patent No.: US 12,692,022 B2
(45) Date of Patent: Jul. 28, 2026

(54) AIRCRAFT CABIN DISMANTLING AND RECYCLING

(71) Applicant: AIRBUS OPERATIONS GMBH, Hamburg (DE)

(72) Inventors: Matthias Reiss, Hamburg (DE); Antje Terno, Hamburg (DE); Thorsten Otto, Hamburg (DE); Matthias Poggensee, Hamburg (DE); Sonja Rehsöft, Hamburg (DE); Axel Becker, Hamburg (DE); Maite Gonzalez Eizaguirre, Hamburg (DE); Rafael Mortensen Ernits, Bremen (DE); Dennis Keiser, Hamburg (DE); Michael Freitag, Bremen (DE); Birte Pupkes, Bremen (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 432 days.

(21) Appl. No.: 18/331,025

(22) Filed: Jun. 7, 2023

(65) Prior Publication Data

US 2023/0406541 A1 Dec. 21, 2023

(30) Foreign Application Priority Data

Jun. 8, 2022 (EP) ..................................... 22177908

(51) Int. Cl.
*B64F 5/50* (2017.01)
*G06V 10/74* (2022.01)

(52) U.S. Cl.
CPC .............. *B64F 5/50* (2017.01); *G06V 10/761* (2022.01)

(58) Field of Classification Search
CPC ........................ G06Q 10/0833; G01C 21/3469
(Continued)

(56) References Cited

U.S. PATENT DOCUMENTS 9,452,582 B2     9/2016 Takakura
10,755,689 B1 *   8/2020 Dean-Bhïyan .......... H04L 65/70
(Continued)

FOREIGN PATENT DOCUMENTS

| CN | 105752208 A | 7/2016 |
| CN | 104494732 B | 2/2017 |
| JP | 4365088 B2 | 8/2009 |

OTHER PUBLICATIONS

"Assembly Concepts for Aircraft Cabin Installation" Published by The American Society of Mechanical Engineers (Year: 2010).*
(Continued)

*Primary Examiner* — Zeina Elchanti
(74) *Attorney, Agent, or Firm* — Nixon & Vanderhye P.C.

(57) ABSTRACT

An aircraft cabin dismantling and recycling system including: a device (10) for transferring aircraft cabin parts to secondary utilization is provided that includes a data input (12), a data processor (14) and an output interface (16). The data input provides cabin base types from a database and initial equipment installation states of the aircraft cabin from an installation state database. The data processor is configured to identify a cabin base type for a current part of the aircraft cabin; assign an initial equipment installation state of the aircraft cabin; estimate changes of the current part and determine a current parameter; identify implementable transferring options for the current part of the aircraft cabin from a database of transferring options based on the current parameter, and select one of the identified transferring options.

15 Claims, 8 Drawing Sheets

(58) Field of Classification Search
USPC ........................................................ 700/213
See application file for complete search history.

(56) References Cited

U.S. PATENT DOCUMENTS

| 12,258,126 B2 * | 3/2025 | Kurz ................. B64D 11/0015 |
| 2009/0200212 A1 | 8/2009 | Hachin et al. |
| 2010/0276578 A1 * | 11/2010 | Shelley .............. G01N 21/3563 |
| | | 250/339.07 |
| 2016/0274062 A1 * | 9/2016 | Takahashi ............ G01N 29/043 |

OTHER PUBLICATIONS

Michael Saidani, et al., "Dismantling, remanufacturing and recovering heavy vehicles in a circular economy-Technico-economic and organisational lessons learnt from an industrial pilot study", Resources, Conservation and Recycling, vol. 156, available online Feb. 6, 2020, 18 pages.
Extended European Search Report for EP Application No. 22177908.5 mailed Dec. 1, 2022, 9 pages.

* cited by examiner

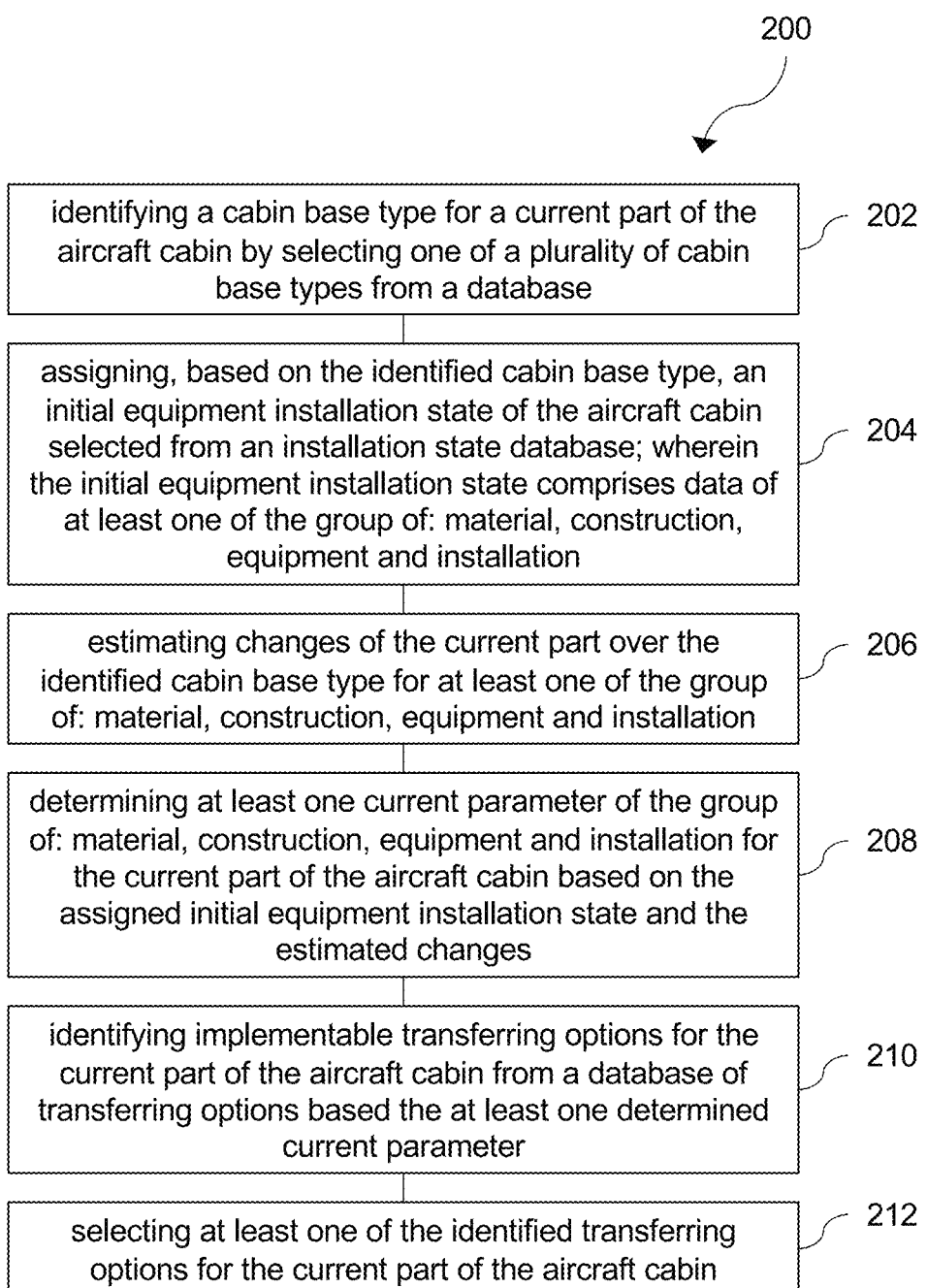

200 identifying a cabin base type for a current part of the aircraft cabin by selecting one of a plurality of cabin base types from a database          202 assigning, based on the identified cabin base type, an initial equipment installation state of the aircraft cabin selected from an installation state database; wherein the initial equipment installation state comprises data of at least one of the group of: material, construction, equipment and installation          204 estimating changes of the current part over the identified cabin base type for at least one of the group of: material, construction, equipment and installation          206 determining at least one current parameter of the group of: material, construction, equipment and installation for the current part of the aircraft cabin based on the assigned initial equipment installation state and the estimated changes          208 identifying implementable transferring options for the current part of the aircraft cabin from a database of transferring options based the at least one determined current parameter          210 selecting at least one of the identified transferring options for the current part of the aircraft cabin          212

Start

404

Login

406

Part Identification

408

Overview

410

Navigation Tree

412

Materials

414

Recycling

416

Handbook

418

Dashboard

420

End

AIRCRAFT CABIN DISMANTLING AND RECYCLING

RELATED APPLICATION

This application incorporates by reference and claims priority to European patent application EP22177908.5 filed Jun. 8, 2022.

TECHNICAL FIELD

The present invention relates to aircraft cabin dismantling and recycling. The present invention relates in particular to a device for transferring aircraft cabin parts to secondary utilization, to a system for transferring aircraft cabin parts to secondary utilization and to a method for transferring aircraft cabin parts to secondary utilization.

BACKGROUND OF THE INVENTION

Environmental aspects are of increasing importance for the use of aircrafts, besides economical aspects. While the environmental impact of the actual operation is continuously reduced, for example by substantial reductions in fuel consumption and generated noise, also the manufacturing process is constantly improved with regards to sustainability. As a further example, in the context of life cycle assessment (LCA), the environmental impact of products or services is assessed considering the entire life cycle. One important aspect regarding the environmental impact, besides materials, manufacturing and the operation, is concerning what happens after an aircraft is no longer used for its actual purpose of flying. Recycling of complete aircrafts has thus become increasingly important. However, it has been shown that besides the aircraft fuselage and wings, also the fate and further disposition of cabin interior needs to be considered when reducing the overall environmental impact of an aircraft.

SUMMARY

There may thus be a need to provide improved guidance relating to aircraft cabins when they are no longer used in their initial purpose.

It should be noted that the following described aspects of the invention apply also for the device for transferring aircraft cabin parts to secondary utilization, for the system for transferring aircraft cabin parts to secondary utilization and for the method for transferring aircraft cabin parts to secondary utilization.

The invention may be embodied as a device for transferring aircraft cabin parts to secondary utilization. The device comprises a data input, a data processor and an output interface. The data input is configured to provide a plurality of cabin base types from a database. The data input is also configured to provide a plurality of initial equipment installation states of the aircraft cabin from an installation state database. The initial equipment installation state comprises data of at least one of the group of: material, construction, equipment and installation. The data input is also configured to provide a plurality of implementable transferring options from a database of transferring options. The data processor is configured to identify a cabin base type for a current part of the aircraft cabin by selecting one of the plurality of cabin base types from a database. The data processor is also configured to assign, based on the identified cabin base type, one of the plurality of initial equipment installation states of the aircraft cabin. The data processor is further configured to estimate changes of the current part over the identified cabin base type for at least one of the group of: material, construction, equipment and installation. The data processor is also configured to determine at least one current parameter of the group of: material, construction, equipment and installation for the current part of the aircraft cabin based on the assigned initial equipment installation state and the estimated changes. The data processor is furthermore configured to identify implementable transferring options for the current part of the aircraft cabin from a database of transferring options based the at least one determined current parameter. The data processor is still further configured to select at least one of the identified transferring options for the current part of the aircraft cabin. The output interface is configured to provide the selected identified transferring option.

An advantage, it is provided an improvement of the data basis for life cycle assessments. Also end-to-end consideration of the life cycle of the cabin is supported. Further, optimization of the environmental footprint of the cabin equipment is enabled. It is also possible to integrate the so-called "design to recycle" approach in cabin development, e.g. also including suppliers.

The selection can be provided by the data processor or by user interaction.

According to an example, the selection is made based on a weighting of a resulting environmental impact comprising at least energy consumption and $CO_2$ emission in view of a predetermined parameter comprising at least one of the group of: a complete life cycle assessment, a remaining life of the aircraft cabin part, a possible energy conversion and a possible material recovery.

In an option, provided in addition or alternatively, a user interaction interface is provided for selecting at least one of the identified transferring options.

According to an example, the data processor is configured to provide instructions for disassembly steps and further proceedings for achieving minimized energy consumption and reduced $CO_2$ emission.

According to an example, an imaging arrangement is provided for supplying image data of at least one of the group of: the current part of the aircraft cabin and a current situation of the aircraft cabin of the current part of the aircraft cabin. The data processor is configured to analyze the image data for similarities with stored image data of a plurality of standard aircraft cabin layouts as provided by at least one of the group of: aircraft manufacturer, original equipment manufacturer, supplier and retrofitter.

According to an example, for the identification of the cabin base type, a first database is provided comprising a plurality of cabin base types provided by the aircraft manufacturer with first sale and delivery of aircrafts.

In an option, provided in addition or alternatively, a second database is provided comprising data related to the transferring options.

According to an example, the transferring options comprise at least one of the group of: re-using the current part, re-using materials from the current part and recycling materials from the current part.

In an option, provided in addition or alternatively, the transferring options comprise at least one of the group of: demounting procedure, disassembling procedure, deconstructing procedure, dismantling procedure, demolishing procedure, shredding procedure, separating procedure and decomposing procedure.

According to an example, for at least one of the group of: the identification of the cabin base type and the estimation of the changes of the current part, the data processor is configured to provide image data representing a current situation of the aircraft cabin of the current part of the aircraft cabin. The data processor is also configured to analyze the image data for similarities with stored image data of a plurality of standard aircraft cabin layouts as provided by at least one of the group of: aircraft manufacturer, original equipment manufacturer, supplier and retrofitter.

According to an example, for the selection, the data processor is configured: to weigh the identified transferring options regarding predetermined categories with declining priorities for reuse as preferred option, followed by recycling and then energy recovery as well as disposal as the final option. Minimized CO2 emissions and reduction of energy consumption are key parameters of the weigh criteria. Further, the data processor is configured to provide, based on the weighting, a scoring for the identified implementable transferring options.

According to an example, for the identification of the implementable transferring options, the data input is configured to provide data from at least one of the following categories: up-to-date material- and construction-related recycling technologies, available material- and construction-related recycling technologies, up-to-date achievable prizes for materials and compounds, aircraft spare parts marketplace, environmental benefit factor and environmental impact factor.

According to an example, the device further comprises an aircraft cabin part assessment assembly. The assessment assembly comprises a movable base, an imaging device for imaging the aircraft cabin parts or samples of the aircraft cabin parts and a user interface for controlling an assessment procedure and for displaying instructions for performing the identified transferring options.

According to the present invention, also a system for transferring aircraft cabin parts to secondary utilization is provided. The system comprises a device for transferring aircraft cabin parts to secondary utilization according to one of the preceding examples. The system also comprises a transferring arrangement to conduct a transfer of the aircraft cabin part. The transferring arrangement is configured to perform the selected identified transferring option on the current aircraft cabin part.

As an advantage, the dismantling and recycling of aircraft cabins and their components is provided with technical and information support. The processes can thus be optimized in terms of increasing the recycling rate, energy impact and the like. This leads to improving the environmental footprint for the end of life stage of aircraft cabins.

As a result, the merging of the digital environment, such as material data base, dismantling handbook data, flight data and maintenance data, and the real environment, such as allocation to the aircraft, cabin adjustments over lifetime and the like, is enabled. Thus, the aggregation of data along the entire product life cycle (from cradle to grave) of the aircraft cabin and aircraft is provided with the aim of supporting the aircraft recyclers in order to optimize their processes.

According to the present invention, also a method for transferring aircraft cabin parts to secondary utilization is provided. The method comprises the following steps: identifying a cabin base type for a current part of the aircraft cabin by selecting one of a plurality of cabin base types from a database; assigning, based on the identified cabin base type, an initial equipment installation state of the aircraft cabin selected from an installation state database; the initial equipment installation state comprises data of at least one of the group of: material, construction, equipment and installation; estimating changes of the current part over the identified cabin base type for at least one of the group of: material, construction, equipment and installation; determining at least one current parameter of the group of: material, construction, equipment and installation for the current part of the aircraft cabin based on the assigned initial equipment installation state and the estimated changes; identifying implementable transferring options for the current part of the aircraft cabin from a database of transferring options based the at least one determined current parameter; and selecting at least one of the identified transferring options for the current part of the aircraft cabin.

According to an aspect, for a current situation of a cabin or cabin parts no longer used in an operating aircraft, details regarding material and construction are provided and used to determine optimized dismantling and further handling steps to transfer the cabin parts to their secondary use, i.e. to define further utilization. This allows an optimized application of recycling and further re-use steps.

According to an aspect, direct support for aircraft dismantler and recycler is provided.

According to an aspect, a recycler is provided with data relating to possible variations of conveying or feeding the aircraft cabin part to a further use like re-use, recycling, material harvesting or energy harvesting. The generated information also reflects and considers changes made during an operation lifetime of the aircraft.

The data processing of the technical data relating to material and construction of the cabin parts allows an optimized way of re-use or recycling, since it is based on actual, i.e. current, data and up-to-date information regarding material recovery processes and up-to-date recycling concepts.

Besides focusing on optimization of a particular target, like maximum recycling of a certain substance, it is also provided to modify the after-use conversion such that an optimized balance between material recovery, re-utilization of portions of the part and energy consumption is provided. In an example, a weighting is provided that leads to a maximum overall result.

As an effect, visualization of transferring aircraft cabin parts is provided. A user is provided with information about: How to provide separation? What is to be separated? It is also provided transparency or at least visibility for material flow and energy flow.

In an option, a convolutional neural network is provided, and artificial intelligence is used for identifying further transferring options.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 5 shows basic steps of an example of a method for transferring aircraft cabin parts to secondary utilization.

DETAILED DESCRIPTION

Figures 1, 2:
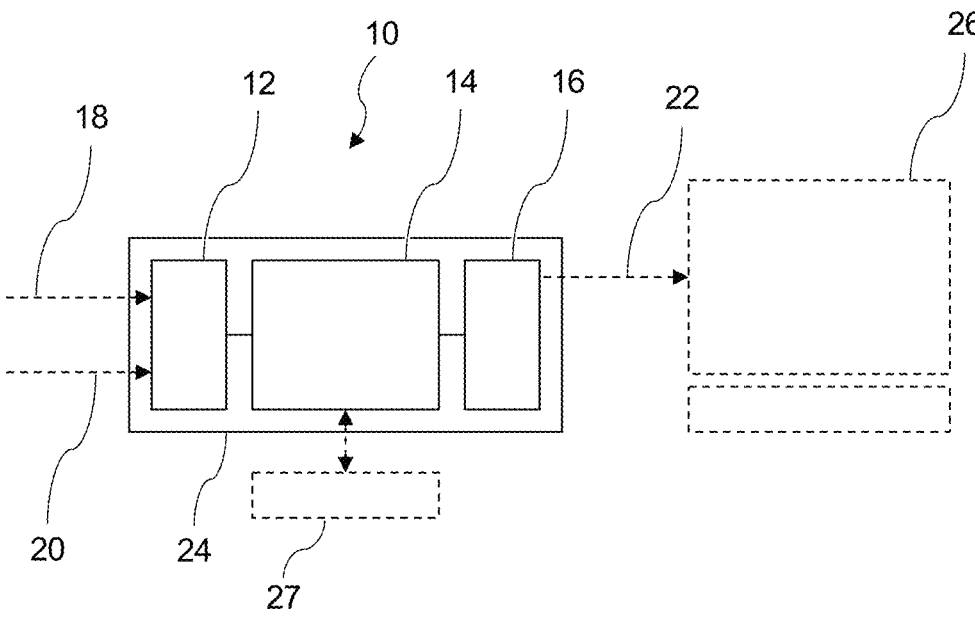
FIG. 1 schematically shows an example of a device for transferring aircraft cabin parts to secondary utilization.
FIG. 2 shows another example of a device for transferring aircraft cabin parts to secondary utilization with an imaging device.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of a device 10 for transferring aircraft cabin parts to secondary utilization. The device 10 comprises a data input 12, a data processor 14 and an output interface 16. The data input 12 is configured to provide a plurality of cabin base types from a database. The data input 12 is also configured to provide a plurality of initial equipment installation states of the aircraft cabin from an installation state database. The initial equipment installation state comprises data of at least one of the group of: material, construction, equipment and installation. The data input 12 is further configured to provide a plurality of implementable transferring options from a database of transferring options. The data processor 14 is configured to identify a cabin base type for a current part of the aircraft cabin by selecting one of the plurality of cabin base types from a database. The data processor 14 is also configured to assign, based on the identified cabin base type, one of the plurality of initial equipment installation states of the aircraft cabin. The data processor 14 is further configured to estimate changes of the current part over the identified cabin base type for at least one of the group of: material, construction, equipment and installation. The data processor 14 is furthermore configured to determine at least one current parameter of the group of: material, construction, equipment and installation for the current part of the aircraft cabin based on the assigned initial equipment installation state and the estimated changes. The data processor 14 is also configured to identify implementable transferring options for the current part of the aircraft cabin from a database of transferring options based the at least one determined current parameter. The data processor 14 is still further configured to select at least one of the identified transferring options for the current part of the aircraft cabin. The output interface 16 is configured to provide the selected identified transferring option.

A first arrow 18 in broken lines indicates a first data supply, like the provision of cabin base types from a database. A second arrow 20 in broken lines indicates a second data supply, like the provision of the plurality of initial equipment installation states of the aircraft cabin from an installation state database. Further data supply is also provided, as described, but not shown with further arrows.

A third arrow 22 in broken lines indicates a data supply to further components, like the provision of the selected identified transferring option.

A frame 24 indicates that, according to an option, the data input 12, the data processor 14 and the output interface 16 can be arranged in a common housing or in an integrated manner. However, they are also provided as separate components in further examples.

A dotted frame indicates a display 26 as an option, e.g. receiving display data from the output interface 16.

The term "secondary utilization" relates to further use of the part in other ways than in its original purpose when serving as part of the aircraft cabin. The secondary utilization can refer to an actual second use, e.g. in a different function. The secondary utilization can also refer to a recycling in which portions or the complete part are used in a different way, such as after dismantled or also as material or substance being supplied to manufacturing procedures of different parts. For example, the material is decomposed or separated, and the different materials are used again in different steps.

The term "part of the aircraft cabin" relates to all kinds of parts and portions of a cabin structure like interior wall segments, monuments, linings, acoustic or thermal cladding or lavatories and galleys including the equipment installed therein. Floor and ceiling panels are also parts of the aircraft cabin, as well as luggage compartments or overhead bins. Seats are also meant by the term "part of the aircraft cabin".

The term "cabin base type" relates to cabin structures that are used, i.e. applied when manufacturing the aircraft, e.g. by the manufacturer of the aircraft. The cabin base types represent a selection of so-to-speak standard cabin configurations commonly used.

The term "initial equipment installation state" relates to different configurations as used, i.e. applied when manufacturing the aircraft, e.g. by the manufacturer of the aircraft.

The term "changes" relates to modifications, alterations, reductions, additions and the like of the cabin. The changes can be caused by maintenance or repair procedures; or simply caused by use or wear of the cabin, or by aging.

The term "implementable" relates to transferring procedures, e.g. recycling procedures, dismantling procedures, separation procedures or other procedures that are actually possible for the current situation. The transferring procedures are thus possible and can be realized for the current situation.

In an example, the selection is made based on a weighting of a resulting environmental impact comprising at least energy consumption and $CO_2$ emission in view of a predetermined parameter comprising at least one of the group of:

a complete life cycle assessment, a remaining life of the aircraft cabin part, a possible energy conversion and a possible material recovery.

In an option, provided in addition or alternatively, a user interaction interface 27 is provided for selecting at least one of the identified transferring options. In an example, the user interaction interface 27 is provided as tablet or another wearable or portable device.

In an example, also costs linked to further processing or possible economic gains of the parts are taken into account.

In an example, the data processor 14 is configured to provide instructions for disassembly steps and further proceedings for achieving minimized energy consumption and reduced CO2 emission.

FIG. 2 shows another example of the device 10 for transferring aircraft cabin parts to secondary utilization with an imaging arrangement 28, e.g., camera, that is provided for supplying image data of at least one of the group of: the current part of the aircraft cabin and a current situation of the aircraft cabin of the current part of the aircraft cabin. The data processor 14 is configured to analyze the image data for similarities with stored image data of a plurality of standard aircraft cabin layouts as provided by at least one of the group of: aircraft manufacturer, original equipment manufacturer, supplier and retrofitter.

In an option, further non-destructive imaging is provided to retrieve information about a setup of the current aircraft cabin part. As an example, X-ray radiation, ultrasound or the like are provided to gain knowledge about a current setup of the aircraft cabin part.

In an option, a material assumption is provided as a starting point for further processing steps.

In an example, a part-number identifier is provided for supplying data of the current part of the aircraft cabin.

In an example, the part-number identifier is provided as an electromagnetic wave reader configured to identify electromagnetic sensitive labels of the current part.

In another example, the part-number identifier is provided as an optical reader configured to identify optical labels of the current part.

FIG. 2 shows, as an option, with or without the imaging arrangement 28, a first database 30 for the identification of the cabin base type. The first database 30 comprises a plurality of cabin base types provided by the aircraft manufacturer with first sale and delivery of the aircraft.

FIG. 2 shows, as another option, in addition or alternatively to the first database 30, and also with or without the imaging arrangement 28, a second database 32 comprising data related to the transferring options.

In another example, the transferring options comprise at least one of the group of: re-using the current part, re-using materials from the current part and recycling materials from the current part.

In an option, the transferring options comprise at least one of the group of: demounting procedure, disassembling procedure, deconstructing procedure, dismantling procedure, demolishing procedure, shredding procedure, separating procedure and decomposing procedure.

In another example, for the identification of the cabin base type, the data input 12 is configured to provide information by a documentation related to the particular aircraft to the current part of the aircraft cabin belongs.

In another example, for at least one of the group of: the estimation of the changes of the current part and the determination of the at least one current parameter, the current part comprises an identificator enabling the user to retrieve information allowing the estimation and/or the determination.

In another example, for at least one of the group of: the identification of the cabin base type and the estimation of the changes of the current part, the data processor 14 is configured to provide image data representing a current situation of the aircraft cabin of the current part of the aircraft cabin. The data processor 14 is configured to analyze the image data for similarities with stored image data of a plurality of standard aircraft cabin layouts as provided by at least one of the group of: aircraft manufacturer, original equipment manufacturer, supplier and retrofitter.

In another example, for the selection, the data processor 14 is configured to weigh the identified transferring options regarding predetermined categories with declining priorities for reuse as preferred option, followed by recycling and then energy recovery as well as disposal as the final option. Minimized CO2 emissions and reduction of energy consumption are key parameters of the weigh criteria. The data processor 14 is configured to provide, based on the weighting, a scoring for the identified implementable transferring options.

In another example, for the identification of the implementable transferring options, the data input 12 is configured to provide data from at least one of the following categories: (i) up-to-date material- and construction-related recycling technologies; (ii) available material- and construction-related recycling technologies; (iii) up-to-date achievable prizes for materials and compounds; (iv) aircraft spare parts marketplace; (v) environmental benefit factor; and (vi) environmental impact factor.

Figure 3:
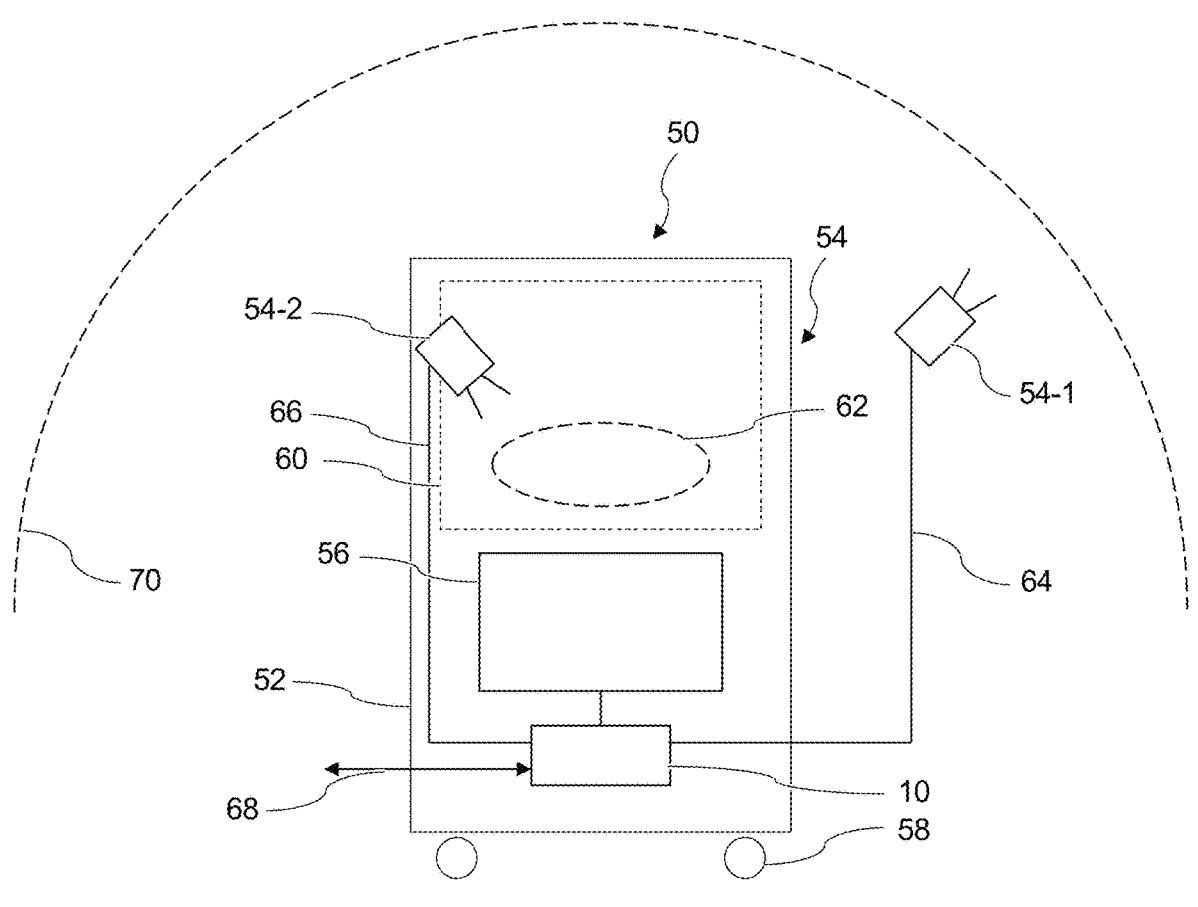
FIG. 3 shows a further example of a device for transferring aircraft cabin parts to secondary utilization, the device comprising a mobile base.

FIG. 3 shows a further example of the device 10 for transferring aircraft cabin parts to secondary utilization. The device 10 further comprises an aircraft cabin part assessment assembly 50. The assessment assembly 50 comprises a movable base 52 and an imaging device 54, e.g., camera, for imaging the aircraft cabin parts or samples of the aircraft cabin parts. A first example for the imaging device 54 is indicated as an external movable camera 54-1 operating with visible light or other movable imaging device, e.g. cameras operating with infrared, or ultrasound imaging or even X-ray imaging. Further, a user interface 56 for controlling an assessment procedure and for displaying instructions for performing the identified transferring options. The movable base 52 is shown with wheels 58. As an option, a receptacle 60 for receiving cabin parts 62 is provided. A second example for the imaging device 54 is indicated as an internal imaging device 54-2 like a further camera, to provide image data of the cabin part 62 arranged in the receptacle 60. A first data connection 64 is indicated for connecting the external movable camera 54-1, e.g. wireless or wire-based. A second data connection 66 is indicated for connecting the internal imaging device 54-2, e.g. wireless or wire-based. A double arrow 68 indicates data exchange of the device 10 for transferring aircraft cabin parts to secondary utilization.

The movable base 52 allows to arrange the device 10 for transferring aircraft cabin parts to secondary utilization inside a cabin space where cabin parts are to be transferred to secondary use, such as reuse, recycling or material conversion.

In an option, the assessment assembly 50 comprises a section for receiving the aircraft cabin parts or the samples of the aircraft cabin parts. The assessment assembly 50 can also be referred to as mobile lab.

According to an aspect, recycling or re-use of the part is customized to the current situation taking also into account changes made for the part. This allows an optimized transferring, i.e. recycling or re-use, of the cabin parts when they are no longer in use.

Figure 4:
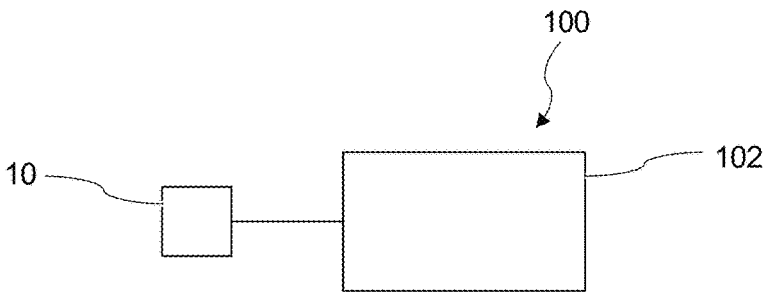
FIG. 4 schematically shows an example of a system for transferring aircraft cabin parts to secondary utilization.

FIG. 4 schematically shows an example of a system 100 for transferring aircraft cabin parts to secondary utilization. The system 100 comprises an example of the device 10 for transferring aircraft cabin parts to secondary utilization according to one of the preceding and following examples. The system 100 further comprises a transferring arrangement 102 to conduct a transfer of the aircraft cabin part. (The transferring arrangement is shown as box representing different options for the transfer of the aircraft cabin parts to a secondary utilization.) The transferring arrangement 102 is configured to perform the selected identified transferring option on the current aircraft cabin part.

The transferring arrangement, such as a recycling arrangement, can thus be adapted to the current situation.

Thus, a technical assistance system is provided to support the users in their tasks with information as important instruments for process optimization during e.g. the recycling of an aircraft. As an example, data can be directly or indirectly used for adapting steps in demounting, disassembly or recycling. Therefore, it can be used for improving the eco-efficiency of aircraft cabins.

As a result, also data acquisition regarding the end of life approach including recycling data is provided. By identifying and providing the implementable transferring options, improvement suggestions of the recycler regarding a better recyclability are enabled.

Thus, a user interface is provided for visualization of material data and a dismantling handbook. This also allows a systematic recording of the recycling process for end-to-end optimization of the aircraft. To further improve the effectiveness, a database for monitoring cabin changes, e.g. retrofitting, is provided. As an option, external and internal interfaces for monitoring can provide data on cabin changes, by e.g. manufacturer, maintenance repair and operation (MRO), aircraft customer service or the airline itself, i.e. the aircraft operator. Further, an airline interface is provided to provide actual cabin data.

The system provides an identification of components and assemblies inside the aircraft cabin.

As explained above, for the transferring process, such as the recycling process, different information is needed on different steps. That information is categorized in the following categories: An overview may include a navigation tree, the location in an aircraft and part information. On a material level, specific material information including material breakdown for assemblies is provided. For recycling, possible recycling approaches are provided. On a more detailed level, handbook information provides dismantling information, e.g. with step by step instructions for an operator. Further, on a dashboard level, key performance indices (KPIs) for processes are provided.

The presented user interface can be displayed on a wearable.

FIG. 5 shows basic steps of an example of a method 200 for transferring aircraft cabin parts to secondary utilization. The method 200 comprises the following steps:

In a first step 202, a cabin base type for a current part of the aircraft cabin is identified by selecting one of a plurality of cabin base types from a database. In a second step 204, based on the identified cabin base type, an initial equipment installation state of the aircraft cabin selected from an installation state database is assigned. The initial equipment installation state comprises data of at least one of the group of: material, construction, equipment and installation. In a third step 206, changes of the current part over the identified cabin base type are estimated for at least one of the group of: material, construction, equipment and installation. In a fourth step 208, at least one current parameter is determined of the group of: material, construction, equipment and installation for the current part of the aircraft cabin based on the assigned initial equipment installation state and the estimated changes. In a fifth step 210, implementable transferring options are identified for the current part of the aircraft cabin from a database of transferring options based the at least one determined current parameter. In a sixth step 212, at least one of the identified transferring options for the current part of the aircraft cabin is selected.

Figure 6:
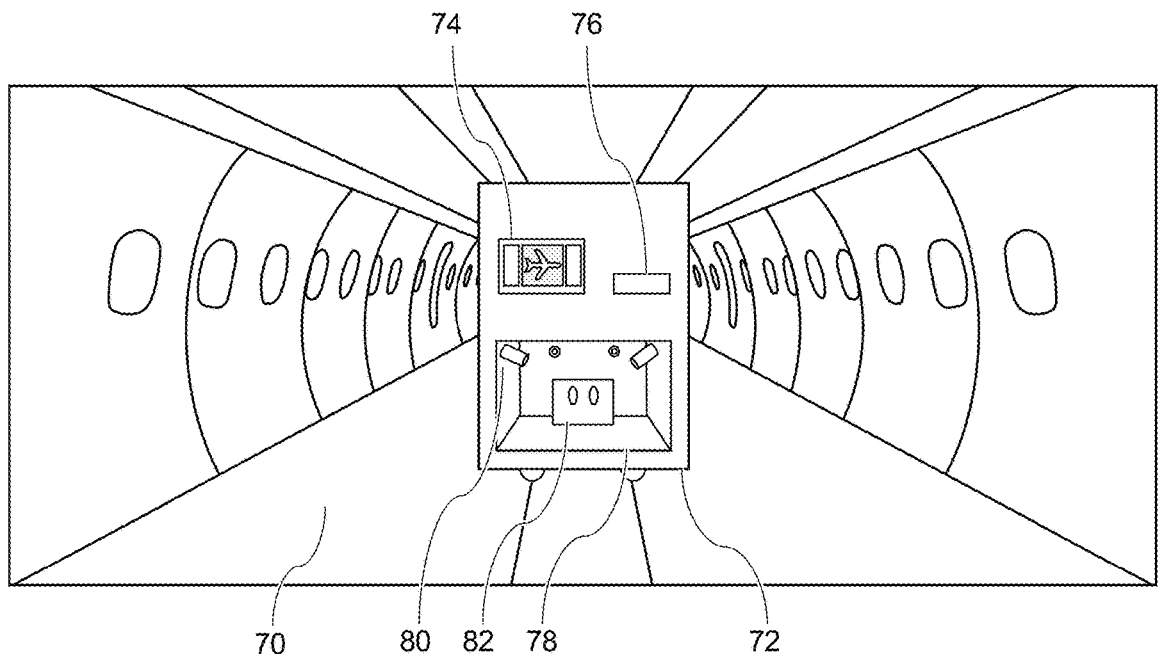
FIG. 6 shows a scenery in an aircraft cabin space with a mobile platform comprising a device for transferring aircraft cabin parts to secondary utilization.

FIG. 6 shows a scenery in an aircraft cabin space with another example of a mobile platform comprising an example of the device 10 for transferring aircraft cabin parts to secondary utilization. FIG. 6 shows an example of the assessment assembly 50 with a box 72 using cameras and image processing. This box may be mobile and can be used inside the cabin during recycling, but also outside the cabin. FIG. 6 shows the functionalities. In an example, the box includes a touch display 74 for the user interface 56, a scanner 76, a movable platform with a mobile lab 78 with doors, cameras 80, and lights, in which cabin part samples 82 can be placed. The touch display allows 74 to monitor and control the box. It shows the analysis from the mobile lab 78 and might ask for further data input to allow a more accurate specification of e.g., the materials used in the cabin part sample. To analyze the sample, image processing is used. Therefore, the cameras 80 are placed inside the mobile lab 78 as well as additional lights to ensure optimal lighting. For additional identification, the scanner 76 is placed on the outside of the box, allowing easy and fast part identification via other technologies like barcode, near field communication (NFC) or radio frequency identification (RFID). The box 72 can be used inside the cabin as well as outside the cabin.

Figure 7:
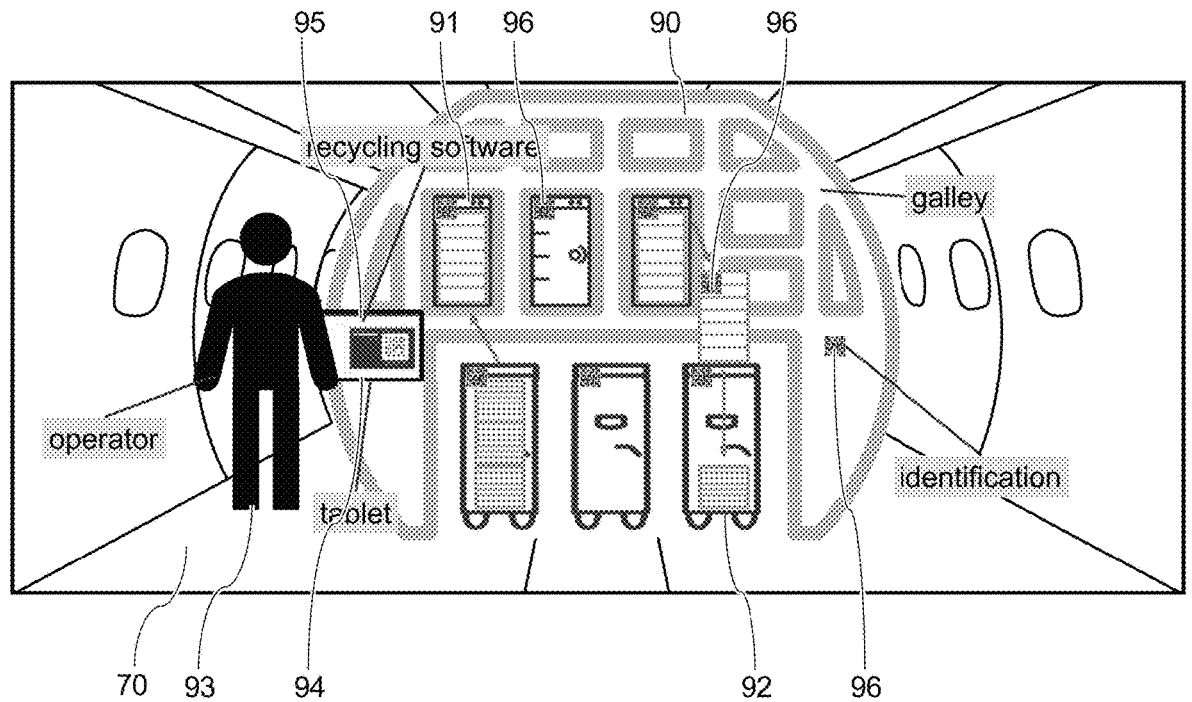
FIG. 7 shows a further scenery in an aircraft cabin space during the process of transferring aircraft cabin parts to secondary utilization.

FIG. 7 shows a scenery in an aircraft cabin space during the process of transferring aircraft cabin parts to secondary utilization. As examples for aircraft parts that are to be transferred from their initial use to a secondary utilization, a galley 90 is shown with inserts 91 and trolleys 92 parked in stowage compartments. A user 93 is provided with an interface like a tablet 94 for identifying the technical data of the cabin parts. The tablet 93 is equipped with e.g. recycling software 95 and further use data.

As an example, provided in addition or alternatively to image-based detection, identificators 96 like labels can be provided with the aircraft parts that are to be transferred, like the galley 90 with the inserts 91 and the trolleys 92. The user 93 can thus gather information about the current state of the cabin parts, in particular constructive details and material details for supporting the goal to reduce the environmental impact.

Figure 8:
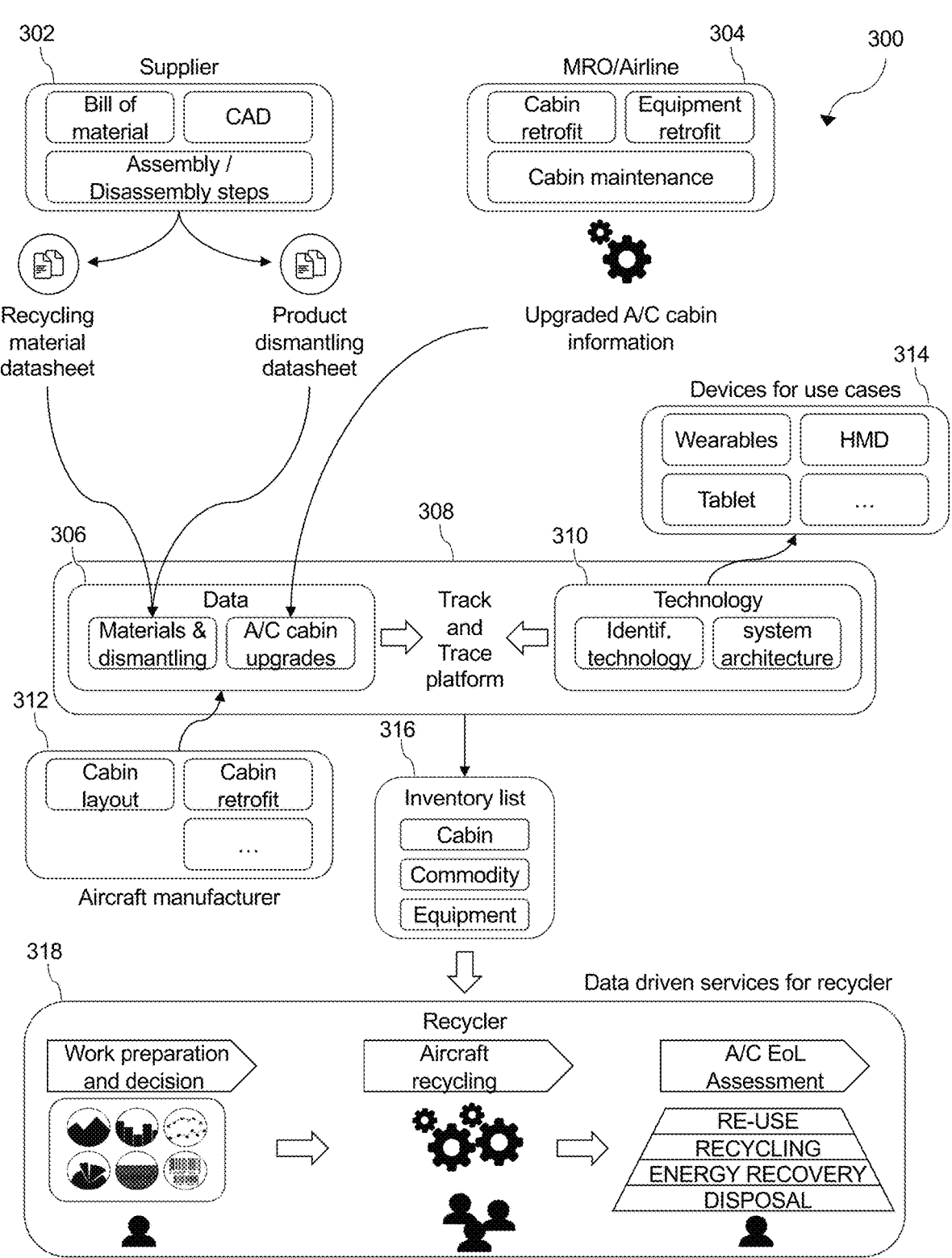
FIG. 8 shows a diagram of an example of a workflow for transferring aircraft cabin parts to secondary utilization.

FIG. 8 shows a diagram of an example of a workflow 300 for transferring aircraft cabin parts to a secondary utilization. A supplier 302 provides, for example, bills of material used, technical drawings e.g. provided with computer aided design (CAD) and also assembly and disassembly steps. This may be provided as recycling material datasheets and product dismantling datasheets. An operator related party 304, like maintenance-repair-and-operation (MRO) or an airline provides the technical data concerning cabin retrofit, equipment retrofit and cabin maintenance. This may be provided as upgraded aircraft (A/C) cabin information. The technical data is then supplied as data 306 to a track and trace platform 308. The data comprises materials and dismantling data, as well as the A/C cabin upgrades data. Further technology data 310 is provided, like identification technology and system architecture. The technology data 310 is also provided to devices 314 for use cases, comprising wearables, tablets, head mounted display and the like. A further input to the data 306 is also coming from an aircraft manufacturer 312, such as the cabin layout data and also cabin retrofit data. A result from the track and trace platform is an inventory list 316 comprising cabin, commodities and equipment. This then provided to data driven services 318 for recycler, as an example, comprising work preparation and decision, aircraft recycling and aircraft end of life (A/C EoL) assessment with a weighting, e.g., from top to bottom, re-use, recycling, energy recovery and disposal.

Figure 9:
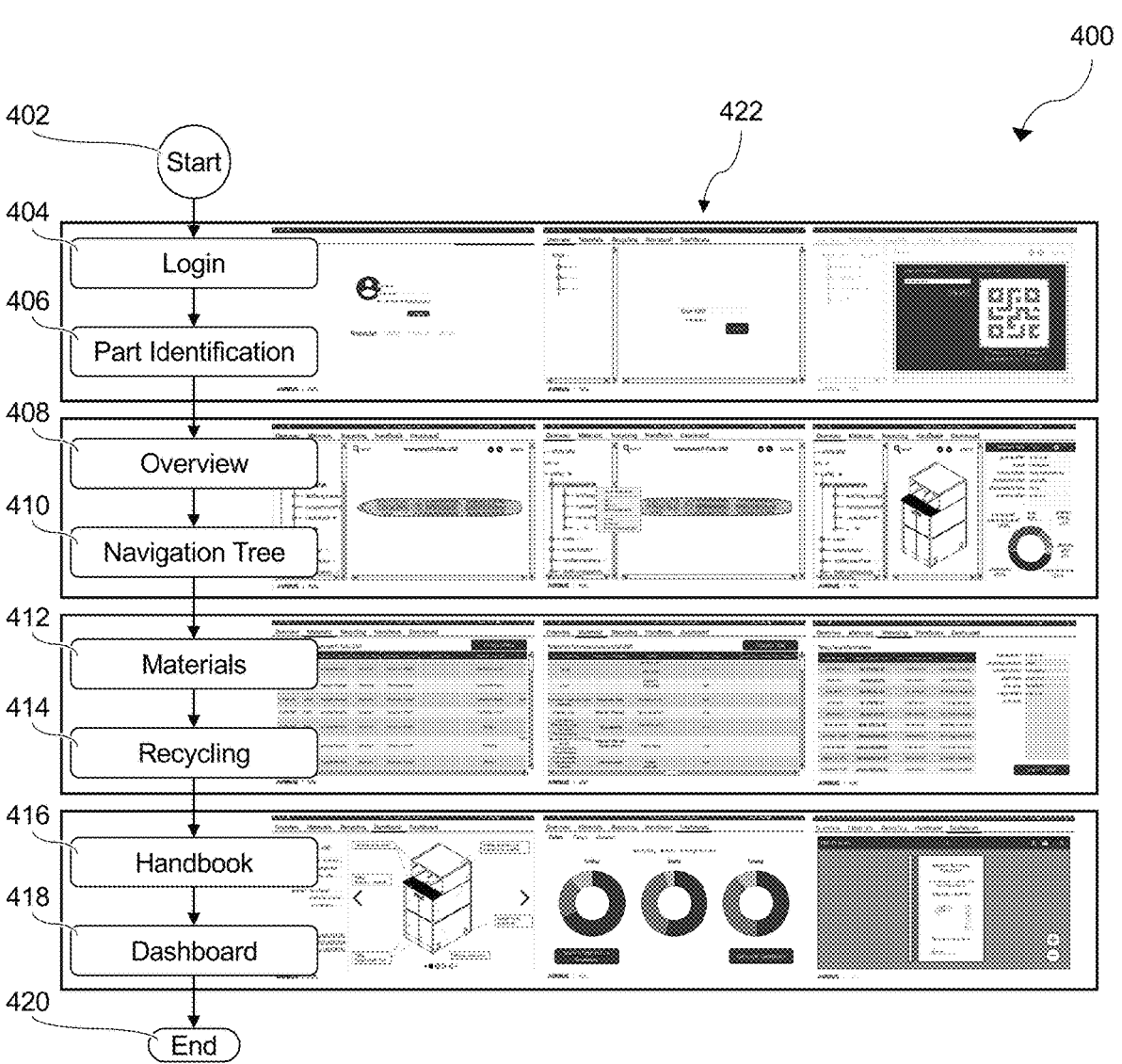
FIG. 9 shows another diagram of a further example of a workflow for transferring aircraft cabin parts to secondary utilization.

FIG. 9 shows another diagram of a further example of a workflow 400 for transferring aircraft cabin parts to secondary utilization. In the example, as shown in FIG. 9, after a start 402, it is provided the steps of: logging in 404, part identification 406, providing an overview 408 of the aircraft cabin, providing a navigation tree 410 within a cabin area, providing materials data 412, providing recycling information 414, providing handbook information 416 and displaying a dashboard 418 with possible transferring options, such as recycling or re-use or secondary us or parts, followed by an end 420. On the right hand side, respective graphical user interfaces 422 are shown in a miniaturized manner.

Figure 10:
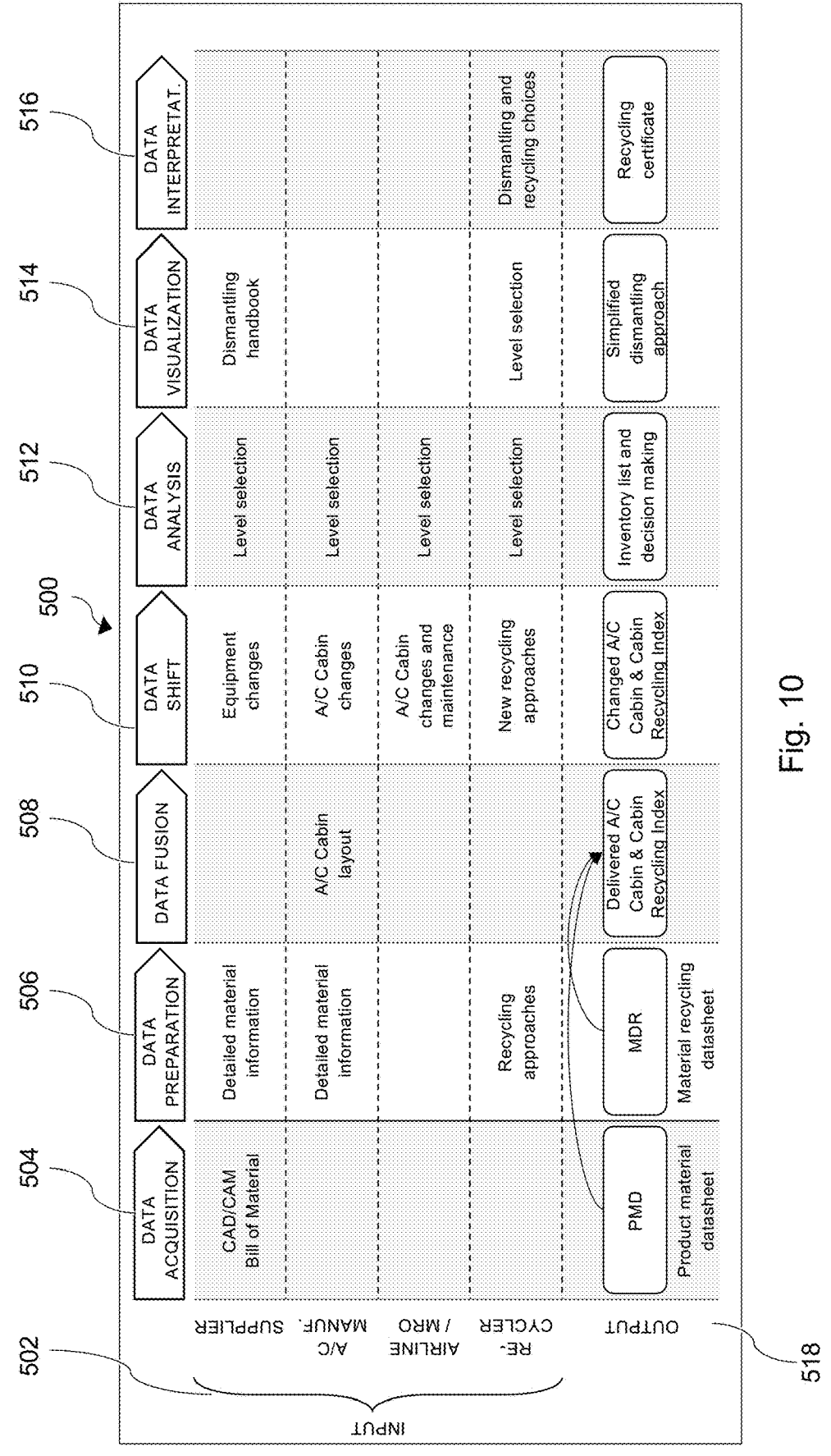
FIG. 10 shows a further diagram relating to the workflow for transferring aircraft cabin parts to secondary utilization.

FIG. 10 shows (in landscape manner of the sheet) a further diagram relating to the workflow 500 for transferring aircraft cabin parts to secondary utilization. As an input 502, suppliers, A/C manufacturer, airline/MRO and recycler provide data on different levels. First, data acquisition 504 is provided. As an example, this comprises CAD/CAM and bill of material from e.g. the supplier. Next, data preparation 506 is provided. As an example, this comprises detailed material information, e.g. from the supplier and the A/C manufacturer, as well as recycling approaches from the recycler. This is followed by data fusion 508. As an example, this comprises A/C cabin layout from e.g. the A/C manufacturer. A next level is data shift 510. As an example, this comprises equipment changes e.g. from the supplier, A/C cabin changes e.g. from the A/C manufacturer, A/C cabin changes and maintenance e.g. from the airline/MRO and new recycling approaches e.g. from the recycler. Further, data analysis 512 is arranged. As an example, this comprises level selection e.g. from the supplier, the A/C manufacturer, the airline/MRO and the recycler. Following, data visualization 514 is provided. As an example, this comprises dismantling handbook e.g., from the supplier and level selection e.g. from the recycler. The next level is data interpretation 516. As an example, this comprises dismantling and recycling choices e.g. from the recycler.

As an output 518, the data acquisition 504 provides product material datasheets (PMD), provided to the data fusion 508. The data preparation 506 provides material recycling datasheets (MDR), also provided to the data fusion 508. The data fusion 508 provides a delivered A/C cabin and cabin recycling index. The data shift 510 provides a changed A/C cabin & cabin recycling index. The data analysis 512 provides an inventory list and decision making. The data visualization 514 provides a simplified dismantling approach. The data interpretation 516 provides a recycling certificate.

Figures 11, 12:
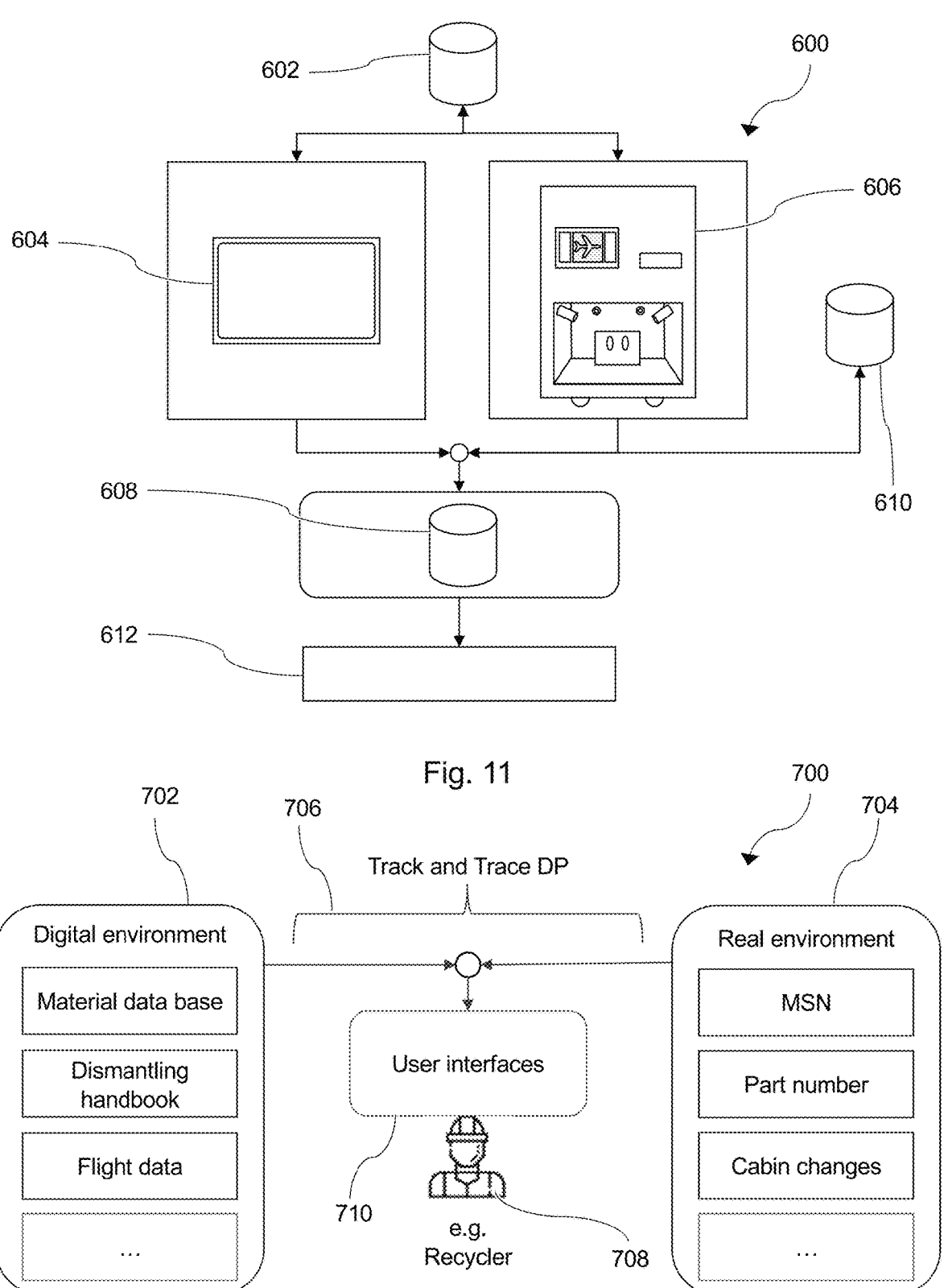
FIG. 11 illustrates an example for a setup of transferring aircraft cabin parts to secondary utilization.
FIG. 12 shows a further example of a workflow for transferring aircraft cabin parts to secondary utilization.

FIG. 11 illustrates an example for a setup 600 of transferring aircraft cabin parts to secondary utilization. At the top, database materials and recycling handbook 602 is provided in communication with a wearable device 604, e.g. a tablet, and an identification system 606. Data is processed and forwarded to an inventory management aircraft dismantler and recycler database 608. Further, also a communication to a LCA aircraft industry database 610 is arranged. On the bottom, an interface 612 to aircraft spare parts marketplace An example of an overall setup is shown in FIG. 11 with a possible interface to an inventory management for the aircraft dismantler and recycler. The interface could be used for spare parts selling in a larger scale. More precisely, a marketplace is conceivable, which could be used on the one hand for aviation-specific companies, but also by other industries. For example, reuse of components and parts in other industries is provided.

FIG. 12 shows a further example of a workflow 700 for transferring aircraft cabin parts to secondary utilization. A digital environment 702 is indicated on the left hand side, comprising e.g. a material data base, a dismantling handbook, flight data and the like. A real environment 704 is indicated on the right hand side, comprising e.g. an MSN, a part number, cabin changes and the like. Via track and trace data processing (DP) 706, new data is generated and provided to a user, e.g. a recycler 708, via user interfaces 710.

In an example, the proposed solution processes specific key figures from the aviation industry. In addition, specific data with regard to the recycling process is provided, e.g. dismantling handbook. Furthermore, a cabin recycling index is introduced. The key module of the proposed data flow is an interface for the tracking and data input of cabin changes along the entire aircraft product life cycle. This allows application for example by airlines, aircraft manufacturer, suppliers and MRO.

As an example, data acquisition is provided as an initial step. Next, data preparation is provided, followed by data fusion and then data shift. After that, data analysis is provided followed by data interpretation.

In an example, it is also provided the step of providing the selected identified transferring option to the user. In an option, in addition or alternatively, selected identified transferring option is provided for further steps.

In an example, the step of determining the at least one current parameter comprises to provide the concrete identification of components and assemblies.

In an example, after selecting the at least one of the identified transferring options, it is provided the step of retrieving of data relevant to the end of life process, e.g. for life cycle assessment procedures.

In an example, the step of selecting the at least one of the identified transferring options also provided operational support of employees with visualizations.

In an example, the step of identifying implementable transferring options for the current part comprises to provide support of decisions regarding the recycling path.

In a further example, documentation of recycling data is provided including an interface to a database for life cycle assessment in the aerospace industry.

In an example, the estimating of changes is provided in order to trace cabin modifications.

In an example, for the estimating of the changes, data is provided tracking all cabin modifications. This ensures traceability of cabin modifications along the entire life cycle.

In an example, the selection is done by an interaction of a user, such as recycling specialist.

In an example, it is provided the initial step of: providing a current part of an aircraft cabin.

In an example of the method, at least one of the group of the identified implementable transferring options and the selected implementable transferring options is provided to determine a rate for at least one of the group of: utilization, effort, recycling and material recovery and energy harvesting for the current cabin part. The rate(s) is(are) used for determining end of life (EOL) ratings for the current cabin parts and layout. The rate(s) can also be used to determine an average reference value for the respective cabin part, or cabin part type, or cabin part construction. The average reference value is also referred to as key performance index (KPI). The ratings and KPIs are then provided as constructional parameters for setup of the particular part.

A recycler can thus provide important information back to the cycle of designing/manufacturing/assembling/dismantling/recycling and re-using.

The ratings and KPIs enable to retrieve (or derive) cabin product-related, or cabin project-related, or cabin program-related EOL ratings. These can be collected in a database for continuously determining and updating KPIs for cabin projects, cabin projects and cabin programs. The ratings and KPIs are thus used for reducing economic impacts of aircrafts and can contribute to reducing $CO_2$ and to saving of energy. Both aspects are key for the endeavor in the fight against climate change.

In one example, the results and effects of applying one or several of the transferring options are supplied back into the data chain. As an example, the recycler is feeding the end of life use back to the start, e.g. which and how much material was re-used. The recycler can thus supply real data. This again could be basis for an analysis if the use actually deviates too much from a reference value. Such analysis allows to act as a hint that a better or more efficient end of life use would be possible.

In an example of the method, the transferring options comprise at least one of the group of: re-using the current part, re-using materials from the current part and recycling materials from the current part. As an option, the transferring options comprise at least one of the group of: demounting procedure, disassembling procedure, deconstructing procedure, dismantling procedure, demolishing procedure, shredding procedure, separating procedure and decomposing procedure.

In an example of the method, wherein it is further provided the steps of conducting, realizing, and executing the at least one selected transferring option for the current part of the aircraft cabin.

The re-use can also be referred to as re-utilization, as further use, as subsequent use, as after use or as secondary use or secondary utilization. The re-use of the aircraft cabin part can also be referred to as non-flying use or non-flying purpose.

The term "aircraft cabin parts" relates to parts of the interior of an aircraft such as the passenger cabin sections, the galley sections, the lavatory sections and cockpit sections of an aircraft.

In an option, the method as described above is provided for other aircraft parts that undergo changes during the lifetime and use of the aircraft. Such other aircraft parts comprise aircraft cargo sections, aircraft engines, wing tanks and landing gear.

In an example of the method, for the identifying of the cabin base type, a first database is provided comprising a plurality of cabin base types provided by the aircraft manufacturer with first sale and delivery of aircrafts.

In an example, the first database is provided by the manufacturer or first seller of the aircraft.

In an example of the method, for the identifying of the cabin base type, information is provided by a documentation related to the particular aircraft to the current part of the aircraft cabin belongs.

The documentation comprises at least one of the group of maintenance, repair, retrofit and replacement information.

In an example of the method, for at least one of the group of: the estimating of the changes of the current part and the determining the at least one current parameter, the current part comprises an identificator enabling the user to retrieve information allowing the estimating and/or the determining.

In an example, the identificator is having stored a code providing information about the current situation of the current part and/or the changes made by the current part. As an example, the identificator is a visual label having a code like a QR code or a bar code. As another example, the identificator is an electromagnetic code readable by electromagnetic code readers, e.g. operating with NCF (near field communication) or RFDI (radio frequency identification).

In an example of the method, for at least one of the group of: the identifying a cabin base type and the estimating of the changes of the current part, it is provided the steps of: (i) providing image data representing a current situation of the aircraft cabin of the current part of the aircraft cabin; and (ii) analyzing the image data for similarities with stored image data of a plurality of standard aircraft cabin layouts as provided by at least one of the group of: aircraft manufacturer, original equipment manufacturer, supplier and retrofitter.

In an example of the method, for the selecting, a weighting is provided regarding predetermined categories with declining priorities for reuse as preferred option, followed by recycling and then energy recovery as well as disposal as the final option; and wherein, based on the weighting, a scoring for the identified implementable transferring options is provided.

In an example of the method, wherein, for the identifying of the implementable transferring options, data from at least one of the following categories is provided: up-to-date material- and construction-related recycling technologies, available material- and construction-related recycling technologies, up-to-date achievable prizes for materials and compounds, aircraft spare parts marketplace, environmental benefit factor and environmental impact factor.

As an effect, data-based support is provided for aircraft dismantlers and recyclers. Besides a software solution, a mobile system for identifying aircraft cabin components is provided. The process in combination with the system enables a quick and easy identification of components and retrieval of data, e.g. material information and dismantling information.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit or be distributed over more than one computer units, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As discussed above, the processing unit, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The word "or" means either or both, unless clearly indicated otherwise. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An assessment assembly configured to collect cabin parts from a cabin in an aircraft, wherein the cabin parts are collected for secondary utilization, the assessment assembly comprising:

a mobile base configured to move within the cabin to collect the cabin parts;

a receptacle configured carried by the mobile base, wherein the receptacle is configured to receive and temporarily store at least a current cabin part of the cabin parts;

a data input;

a data processor; and an output interface;

wherein the data input is configured:

to provide a plurality of cabin base types from a database;

to provide a plurality of initial equipment installation states of the aircraft cabin from an installation state database, wherein the initial equipment installation state comprises data of at least one of a group of: material, construction, equipment and installation; and to provide a plurality of implementable transferring options from a database of transferring options;

wherein the data processor is configured:

to identify a cabin base type for the current part of the aircraft cabin by selecting one of the plurality of cabin base types from a database;

to assign, based on the identified cabin base type, one of the plurality of initial equipment installation states of the aircraft cabin;

to estimate changes of the current part over the identified cabin base type for at least one of the group of: material, construction, equipment and installation;

to determine at least one current parameter of the group of: material, construction, equipment and installation for the current part of the aircraft cabin based on the assigned initial equipment installation state and the estimated changes;

to identify implementable transferring options for the current part of the aircraft cabin from a database of transferring options based the at least one determined current parameter; and to select at least one of the identified transferring options for the current part of the aircraft cabin; and wherein the output interface is configured to present or provide the selected identified at least one transferring option for the current part temporality stored in the receptacle.

2. The assessment assembly according to claim 1, wherein the selection is made based on a weighting of a resulting environmental impact comprising at least energy consumption and $CO_2$ emission in view of a predetermined parameter comprising at least one of a group of: a complete life cycle assessment, a remaining life of the aircraft cabin part, a possible energy conversion and a possible material recovery; and wherein a user interaction interface is provided for selecting at least one of the identified transferring options.

3. The assessment assembly according to claim 1, wherein the data processor is configured to provide instructions for disassembly steps and for further proceedings to minimize energy consumption and reduce $CO_2$ emission.

4. The assessment assembly according to claim 1, further comprising an imaging device mounted to the mobile base and configured to image the current cabin part and generate image data of the current cabin part;

wherein the further comprising an imaging arrangement configured to supply image data of at least one of: the current part of the aircraft cabin; and a current situation of the aircraft cabin of the current part of the aircraft cabin;

wherein the data processor is configured to analyze the image data for similarities with stored image data of a plurality of standard aircraft cabin layouts as provided by at least one of a group of: aircraft manufacturer, original equipment manufacturer, supplier and retrofitter.

5. The assessment assembly according to claim 1, wherein, for the identification of the cabin base type, a first database is provided comprising a plurality of cabin base types provided by the aircraft manufacturer with first sale and delivery of aircrafts; and wherein a second database is provided comprising data related to the transferring options.

6. The assessment assembly according to claim 1, wherein the transferring options comprise at least one of a group of: re-using the current part, re-using materials from the current part and recycling materials from the current part; and wherein the transferring options comprise at least one of a group of: demounting procedure, disassembling procedure, deconstructing procedure, dismantling procedure, demolishing procedure, shredding procedure, separating procedure and decomposing procedure.

7. The assessment assembly according to claim 1, wherein, for the identification of the cabin base type, the data input is configured to provide information by a documentation related to the particular aircraft to the current part of the aircraft cabin belongs.

8. The assessment assembly according to claim 1, wherein, for at least one of a group including the estimation of the changes of the current part and the determination of the at least one current parameter, the current part comprises an identificator enabling the user to retrieve information allowing the estimation and/or the determination.

9. The assessment assembly according to claim 1, further comprising an imaging device mounted to the mobile base and configured to image the current cabin part and generate image data of the current cabin part;

wherein, for at least one of the group of the identification of the cabin base type and the estimation of the changes of the current part, the data processor is configured:

to provide the image data representing a current situation of the aircraft cabin of the current part of the aircraft cabin; and to analyze the image data for similarities with stored image data of a plurality of standard aircraft cabin layouts as provided by at least one of the group of: aircraft manufacturer, original equipment manufacturer, supplier and retrofitter.

10. The assessment assembly according to claim 1, wherein, for the selection, the data processor is configured: to weigh the identified transferring options regarding predetermined categories with declining priorities for reuse as preferred option, followed by recycling and then energy recovery as well as disposal as the final option;

wherein minimized $CO_2$ emissions and reduction of energy consumption are key parameters of the weigh criteria; and wherein the data processor is configured: to provide, based on the weighting, a scoring for the identified implementable transferring options.

11. The assessment assembly according to claim 1, wherein, for the identification of the implementable transferring options, the data input is configured: to provide data from at least one of the following categories:

up-to-date material-and construction-related recycling technologies;

available material-and construction-related recycling technologies;

up-to-date achievable prizes for materials and compounds;

aircraft spare parts market place;

environmental benefit factor; and environmental impact factor.

12. The assessment assembly according to claim 1, wherein the assessment assembly further comprises:

an imaging device for imaging the cabin parts or samples of the cabin parts; and a user interface for controlling an assessment procedure and for displaying instructions for performing the identified transferring options.

13. A system configured to collect and identify cabin parts in a cabin of an aircraft to be used for secondary utilization, the system comprising:

an assessment assembly configured to collect the cabin parts from a cabin of an aircraft for the secondary utilization, wherein the assessment assembly includes:

a mobile base configured to move within the cabin;

an imaging device attached to the mobile base; and a receptacle carried by the mobile base, wherein the receptacle is configured to temporarily store a current cabin part of the cabin parts;

a data input, a data processor; and an output interface, wherein the data input is configured to:

provide a plurality of cabin base types from a database;

provide a plurality of initial equipment installation states of the aircraft cabin from an installation state database, wherein the initial equipment installation state comprises data of at least one of a group of: material, construction, equipment and installation; and provide a plurality of implementable transferring options from a database of transferring options;

wherein the data processor is configured to:

identify a cabin base type for the current part by selecting one of the plurality of cabin base types from a database;

assign, based on the identified cabin base type, one of the plurality of initial equipment installation states of the aircraft cabin;

estimate changes of the current part over the identified cabin base type for at least one of the group of: material, construction, equipment and installation;

determine at least one current parameter of the group of: material, construction, equipment and installation for the current part of the aircraft cabin based on the assigned initial equipment installation state and the estimated changes;

identify implementable transferring options for the current part of the aircraft cabin from a database of transferring options based the at least one determined current parameter, and select at least one of the identified transferring options for the current part of the aircraft cabin;

wherein the output interface is configured to present or provide the selected identified at least one transferring option, wherein the assessment assembly is configured to conduct a transfer of the current cabin part from the cabin into the receptacle; and wherein the assessment assembly is configured to perform the selected identified transferring option on the current aircraft cabin part.

14. A method for collecting cabin parts from a cabin of an aircraft wherein the cabin parts are to be given a secondary utilization, the method comprising:

maneuvering an assessment assembly through the cabin to collect the cabin parts to be transferred to the secondary utilization, wherein the assessment assembly includes a mobile base configured to move within the cabin; an imaging device attached to the mobile base, and a receptacle configured carried by the mobile base;

transferring a current cabin part of the cabin parts from the cabin to the receptacle;

imaging the current cabin part using the image device;

identifying a cabin base type for the current by selecting one of a plurality of cabin base types from a database using an image of the current cabin part;

assigning to the current cabin part, based on the identified cabin base type, an initial equipment installation state of the aircraft cabin selected from an installation state database, wherein the initial equipment installation state comprises data of at least one of a group of: material, construction, equipment and installation;

estimating changes of the current part over the identified cabin base type for at least one of the group of: material, construction, equipment and installation;

determining at least one current parameter of the current cabin part, wherein the current parameters are at least one of: material, construction, equipment and installation for the current part of the aircraft cabin based on the assigned initial equipment installation state and the estimated changes;

identifying implementable transferring options for the current part of the aircraft cabin from a database of transferring options based the at least one determined current parameter;

selecting at least one of the identified transferring options for the current part of the aircraft cabin, and performing the selected identified transferring option on the current cabin part.

15. A computer program comprising instructions which, when the program is executed by a computer, cause the computer to carry out the method of claim 14.

\* \* \* \* \*